US007383934B2

(12) United States Patent
Yamagishi

(10) Patent No.: US 7,383,934 B2
(45) Date of Patent: Jun. 10, 2008

(54) APPARATUS FOR SUPPORTING OBJECTS TO IDENTIFY

(75) Inventor: Junichi Yamagishi, c/o Unirec Co., Ltd., 6-3, 2-Chome, Kaminarimon, Tait-ku, Toky, 111-0034 (JP)

(73) Assignees: Unirec Co., Ltd., Tokyo (JP); Junichi Yamagishi, Tokyo (JP)

( * ) Notice: Subject to any disclaimer, the term of this patent is extended or adjusted under 35 U.S.C. 154(b) by 686 days.

(21) Appl. No.: 10/606,628

(22) Filed: Jun. 26, 2003

(65) Prior Publication Data

US 2004/0149540 A1 Aug. 5, 2004

(30) Foreign Application Priority Data

Jun. 27, 2002 (JP) .......................... P2002-187129

(51) Int. Cl.

*B65G 43/00* (2006.01)
*B65G 15/64* (2006.01)
*B65G 21/22* (2006.01)
*B65G 47/22* (2006.01)
*B65G 47/24* (2006.01)
*B65G 43/08* (2006.01)
*G07D 3/00* (2006.01)

(52) U.S. Cl. ............. 198/341.03; 198/376; 198/345.1; 453/7

(58) Field of Classification Search ........... 198/341.03, 198/343.2, 340, 345.1, 817, 836.1, 608, 611, 198/379; 453/7, 11

See application file for complete search history.

(56) References Cited

U.S. PATENT DOCUMENTS

| | | | | |
|---|---|---|---|---|
| 3,695,279 | A * | 10/1972 | Black et al. | 453/7 |
| 3,952,861 | A * | 4/1976 | Holmqvist et al. | 198/816 |
| 4,540,946 | A * | 9/1985 | Sainz et al. | 327/555 |
| 5,184,709 | A * | 2/1993 | Nishiumi et al. | 194/318 |
| 5,450,946 | A * | 9/1995 | Sticht | 198/817 |
| 5,876,275 | A * | 3/1999 | Rasmussen | 453/32 |
| 5,910,044 | A * | 6/1999 | Luciano et al. | 453/32 |
| 6,056,108 | A * | 5/2000 | Buchi et al. | 198/395 |
| 6,196,371 | B1 * | 3/2001 | Martin et al. | 194/317 |
| 6,688,458 | B2 * | 2/2004 | Prentice et al. | 198/502.2 |
| 2002/0185810 | A1 * | 12/2002 | Baier et al. | 271/248 |

FOREIGN PATENT DOCUMENTS

JP 10-011629 1/1998

* cited by examiner

*Primary Examiner*—Gene O. Crawford
*Assistant Examiner*—Ramya G. Prakasam
(74) *Attorney, Agent, or Firm*—Jordan and Hamburg LLP

(57) ABSTRACT

An apparatus for supporting objects to identify is manufacturable at low cost and is capable of providing correct images of the objects. The apparatus has belts (19, 21) to transport the objects (M) through a photographing section (13). The apparatus also has strings (27, 29) stretched across the photographing section in the object transporting direction. Each of the objects transported by the belts to the photographing section is supported between the belts and the strings and is photographed from the string side.

16 Claims, 5 Drawing Sheets

APPARATUS FOR SUPPORTING OBJECTS TO IDENTIFY

BACKGROUND OF THE INVENTION

1. Field of the Invention

The present invention relates to an apparatus for supporting objects such as coins, medals, and tokens that are transported, photographed, identified, and sorted.

2. Description of Related Art

An example of an apparatus for supporting objects to identify is disclosed in Japanese Unexamined Patent Application Publication No. 10-11629 shown in FIG. 8. The apparatus of FIG. 8 has a hardened glass 101 and a belt 103.

The belt 103 is driven to transport a coin 105 along the hardened glass 101. A light source 107 emits light, which is reflected by the coin 105 and is received by a line sensor 109 that converts the received light into an electric signal. The electric signal is used to provide an image of the coin 105.

This related art has a problem that dust easily accumulates on and adheres to the hardened glass 101, to prevent the apparatus from obtaining a clear image of the coin 105.

The hardened glass 101 is expensive, increasing the manufacturing cost of the apparatus.

The hardened glass 101 needs an intricate fitting structure, and therefore, the apparatus needs time and labor when repairing, replacing, and maintaining the same.

SUMMARY OF THE INVENTION

An object of the present invention is to provide an apparatus for supporting objects to identify, manufacturable at low cost, capable of providing a correct image of each object, and easy to maintain.

In order to accomplish the object, a first aspect of the present invention provides an apparatus for supporting objects to identify, having a belt configured to transport the objects through a photographing section and a linear material stretched across the photographing section in the object transporting direction. Each of the objects transported by the belt to the photographing section is supported between the belt and the linear material and is photographed from the linear material side.

A second aspect of the present invention provides the apparatus of the first aspect with a frame configured to be detachably attached to the photographing section and having a photographing window across which the linear material is stretched, upstream and downstream guides arranged at upstream and downstream sides of the photographing window, respectively, configured to support the linear material, a slide face formed at least on the upstream guide and facing the belt, and a recess formed in the slide face, configured to receive the linear material. Each of the objects transported by the belt to the photographing section is slid and guided along the slide face on the upstream side of the photographing window toward the linear material and belt that therebetween support and transport the object.

With the apparatus of any one of the first and second aspects, a third aspect of the present invention handles objects that are flat and have disk shapes of different diameters and employs a plurality of the belts and linear materials arranged in parallel with one another, the linear materials being distanced from one another to support and transport the objects of different diameters between the belts and the linear materials.

According to the first aspect, the belt transports objects through the photographing section. The linear material is stretched across the photographing section in the object transporting direction. Each of the objects transported by the belt to the photographing section is supported between the belt and the linear material and is photographed from the linear material side. The photographed image of the object substantially entirely shows the object because the linear material on the object is linear and thin, and therefore, the photographed image is properly usable to identify and sort the object. The first aspect can correctly pick up an image of an object that is stably supported between the linear material and the belt. The structure of supporting an object between the linear material and the belt is manufacturable at low cost. The linear material hardly collects dust, and therefore, a correct image of an object can be taken and the object can correctly be identified according to the image.

In addition to the effects of the first aspect, the second aspect employs the frame detachably attached to the photographing section and having the photographing window across which the linear material is stretched. The frame is detachable for easy maintenance, and therefore, the linear material is easy to replace. The second aspect further employs the upstream and downstream guides arranged at upstream and downstream sides of the photographing window, respectively, to support the linear material. At least the upstream guide has a slide face facing the belt. The slide face has a recess to receive the linear material. Each of the objects transported by the belt to the photographing section is slid and guided along the slide face on the upstream side of the photographing window toward the linear material and belt that therebetween support and transport the object. At this time, the object is smoothly shifted to the linear material and belt without an edge of the object hitting or damaging the linear material. This improves the durability of the linear material.

In addition to the effects of the first and second aspects, the third aspect handles objects that are flat and have disk shapes of different diameters. The third aspect employs a plurality of the belts and linear materials arranged in parallel with one another. The third aspect properly separates the linear materials from one another so that the objects having different diameters are supported and transported between the belts and the linear materials. Namely, the belts and linear materials according to the third aspect can therebetween support each of the objects having different diameters, photograph the object stably supported, and provide a correct image of the object.

DETAILED DESCRIPTION OF EMBODIMENTS

Figure 1:
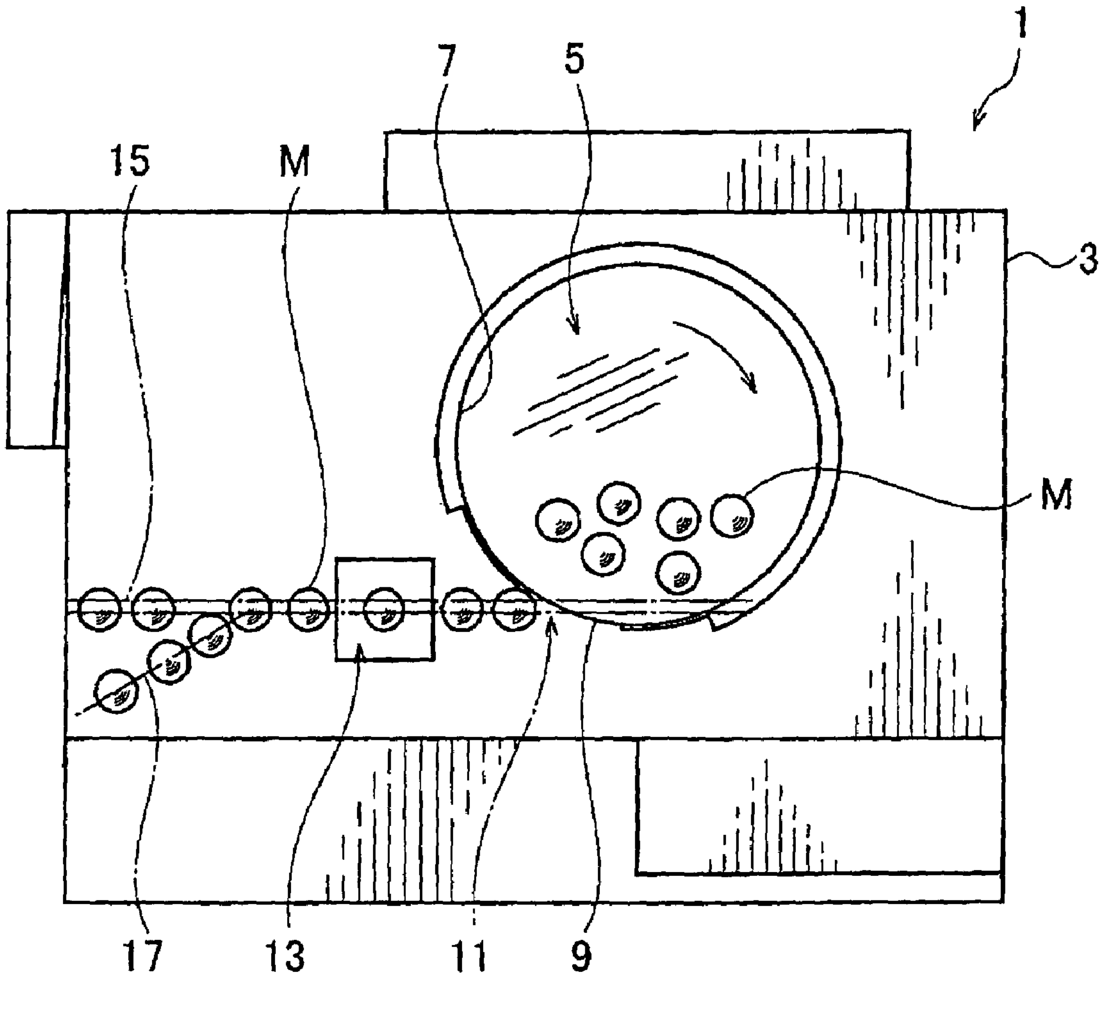
FIG. 1 is a plan view roughly showing an apparatus for supporting objects to identify according to an embodiment of the present invention, the apparatus serving as a sorter to identify and sort tokens.

FIG. 1 is a plan view roughly showing an apparatus for supporting objects to identify according to an embodiment of the present invention. In this embodiment, the apparatus serves as a sorter to identify and sort tokens that are used, for example, when playing game machines in a game arcade. In FIG. 1, the apparatus 1 has a base 3, a turntable 5, a side wall 7 formed along the periphery of the turntable 5, and an opening 9 formed at a part of the side wall 7.

The opening 9 is connected to a transport path 11 having belts to be explained later. In the middle of the transport path 11, there is a photographing section 13 where a frame 31 is arranged. The downstream side of the transport path 11 is divided into a collecting path 15 and a rejecting path 17. Objects to be identified and sorted by the apparatus 1 are transported along the transport path 11. The objects are, for example, flat and disk-like objects and serve as, for example, tokens used in a game arcade. The collecting path 15 passes objects identified as regular, and the rejecting path 17 passes objects identified as irregular.

The photographing section 13 has an image-pickup device such as a CCD camera to photograph an object M transported to the photographing section 13 and provide an image of the object M. On the upstream side of the photographing section 13, there is a sensor (not shown) to detect the object M, and a predetermined time after the detection of the object M, the photographing section 13 activates the CCD camera to pick up an image of the object M.

Figure 2:
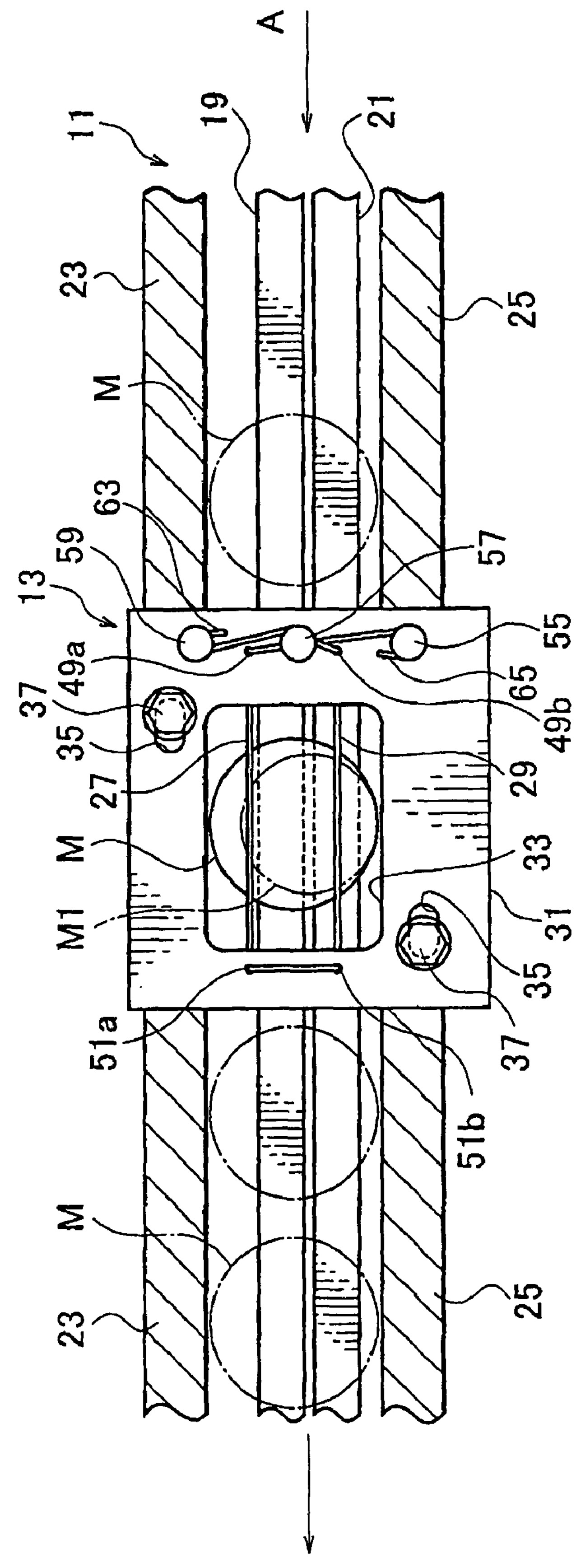
FIG. 2 is a partly broken enlarged view partly showing a transport path and a photographing section in the apparatus of FIG. 1.
Figure 3:
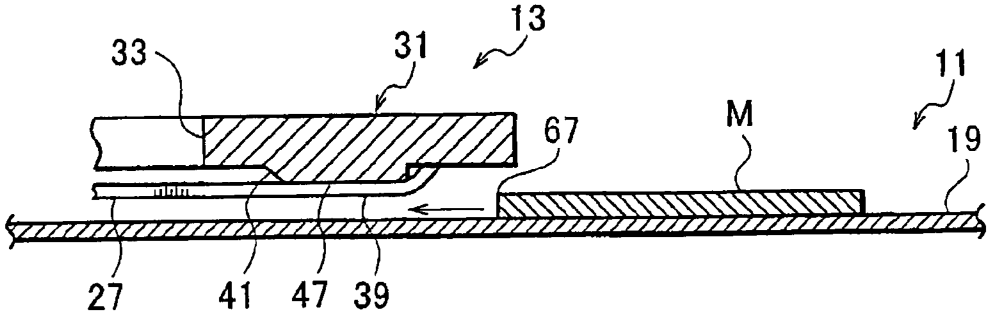
FIG. 3 is an enlarged sectional view partly showing the transport path and photographing section of FIG. 2.

FIGS. 2 and 3 show the details of the transport path 11 and photographing section 13, in which FIG. 2 is a partly broken enlarged view and FIG. 3 is an enlarged sectional view each partly showing the transport path 11 and photographing section 13.

The transport path 11 consists of a plurality of belts, for example, two belts 19 and 21 that run in parallel with each other along the transport path 11 and are driven from the upstream side toward the downstream side of the transport path 11 as indicated with an arrow mark A in FIG. 2. The belts 19 and 21 are made of, for example, rubber or resin and transport objects along the transport path 11 and pass the objects through the photographing section 13.

The photographing section 13 has a plurality of linear materials, for example, two strings 27 and 29. The strings 27 and 29 are arranged in parallel with each other, are stretched in the object transporting direction, and are faced to the belts 19 and 21.

The strings 27 and 29 are linear materials made of, for example, nylon. In this embodiment, they are made from a fishing line.

The strings 27 and 29 are distanced from each other. The string 29 is stretched substantially along the center line of the belt 21 to face the belt 21, and the string 27 is transversally biased from the belt 19. With this arrangement, the belts 19 and 21 and the strings 27 and 29 can therebetween support and transport an object having an optional diameter, e.g., an object M having a large diameter or an object M1 having a small diameter. The large and small objects M and M1 are restricted in their transversal movements by guides 23 and 25 when they are transported along the transport path 11, so that each object can be positioned within a window 33 of the frame 31. Irrespective of the position of the small object M1 whether it is on one or the other side of the window 33, the strings 27 and 29 surely come over and support the object M1.

The strings 27 and 29 are fitted to the frame 31 across the window 33. The window 33 serves as a photographing window when photographing an object (M, M1) at the photographing section 13 with, for example, a CCD camera arranged above the frame 31.

The frame 31 is detachably attached to the base 3 in the photographing section 13. The frame 31 has long holes 35 on each side of the transport path 11. Bolts 37 are passed through the long holes 35 and are fastened to the base 3 to fix the frame 31 to the base 3. With the long holes 35, the position of the frame 31 is finely adjustable in the photographing section 13.

An object (M, M1) is transported on the belts 19 and 21 to the photographing section 13. At the photographing section 13, the object is supported between the strings 27 and 29 and the belts 19 and 21 and is photographed from the string side.

Figure 4:
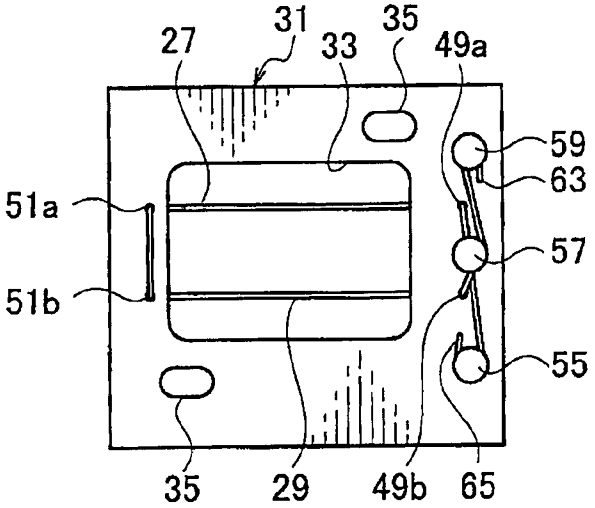
FIG. 4 is a plan view showing a frame with linear materials in the apparatus of FIG. 1.
Figure 5:
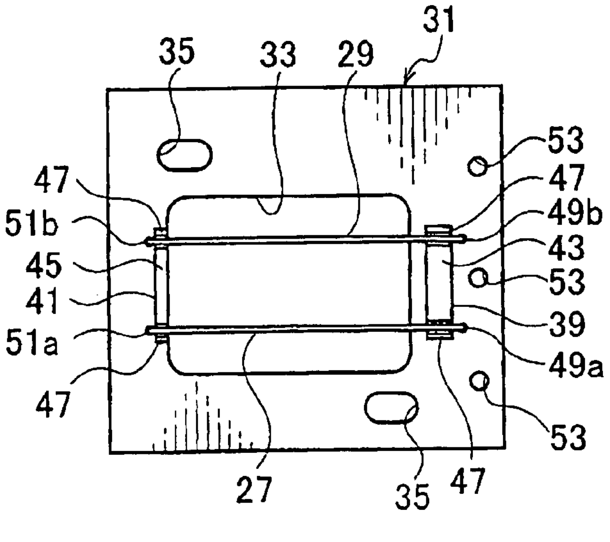
FIG. 5 is a bottom view showing the frame with linear materials of FIG. 4.
Figure 6:
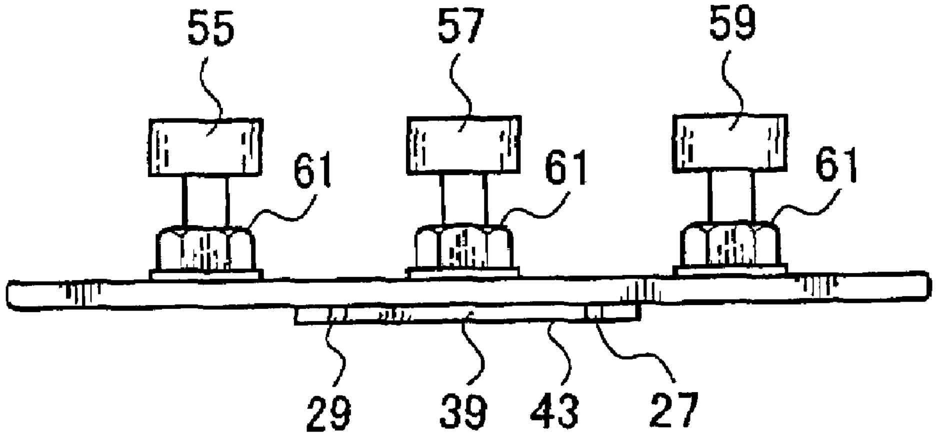
FIG. 6 is a right side view showing the frame with linear materials of FIG. 4.
Figure 7:
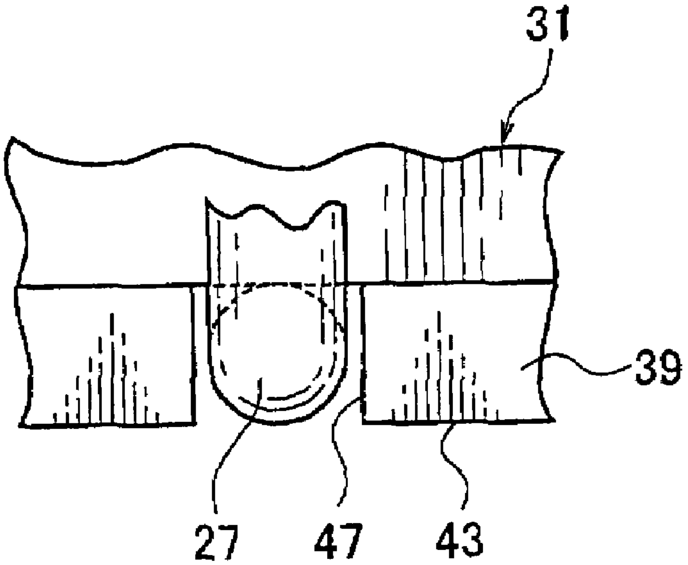
FIG. 7 is an enlarged side view showing the linear material in the frame of FIG. 4.
Figure 8:
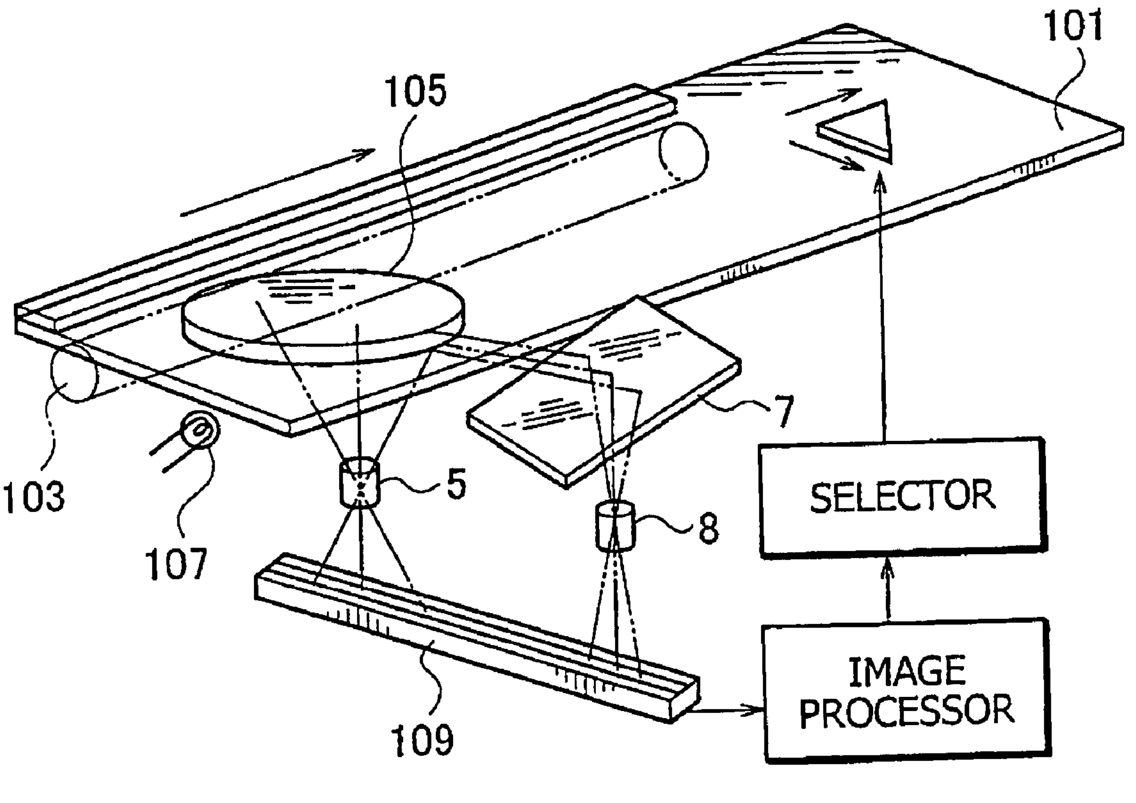
Fig.8 RELATED ART
FIG. 8 is a perspective view showing an apparatus for supporting objects to identify according to a related art.

The details of the frame 31 and strings 27 and 29 will be explained with reference to FIGS. 4 to 7 in which FIG. 4 is a plan view showing the frame 31 and strings 27 and 29, FIG. 5 is a bottom view showing the same, FIG. 6 is a right side view showing the same, and FIG. 7 is an enlarged side view showing the same.

In FIGS. 3 to 6, the bottom of the frame 31 is provided with guides 39 and 41 on the upstream and downstream sides of the window 33, respectively, to support the strings 27 and 29.

The guides 39 and 41 are each quadrate and protrude toward the belts 19 and 21. The guides 39 and 41 have slide faces 43 and 45, respectively. The slide faces 43 and 45 are flat and are substantially parallel to the belts 19 and 21. Each of the slide faces 43 and 45 is provided with recesses 47. FIG. 7 shows the string 27 received in the recess 47 of the slide face 43. The surface of the string 27 does not protrude out of the slide face 43 and is substantially flush with the slide face 43. The same configuration is applied to the string 27 in the recess 47 of the slide face 45 and the string 29 in the recesses 47 of the slide faces 43 and 45.

From the upstream side of the window 33, an object (M, M1) is transported to the window 33, and at there, is supported between the strings 27 and 29 and the belts 19 and 21. On the downstream side of the window 33, the object is shifted to the guide face 45 from between the strings 27 and 29 and the belts 19 and 21.

On the upstream side of the guide 39, the frame 31 has through holes 49*a* and 49*b*. On the downstream side of the guide 41, the frame 31 has through holes 51*a* and 51*b*. On the upstream side of the through holes 49*a* and 49*b*, the frame 31 has threaded holes 53 into which bolts 55, 57, and 59 are screwed from the top surface side of the frame 31.

The bolts 55, 57, and 59 have lock nuts 61, respectively, to fix ends 63 and 65 of the strings 27 and 29.

According to the embodiment, the strings 27 and 29 are made from a fishing line. The fishing line is wound around the bolt 59 at the end 63, is hooked around the bolt 57, is passed through the through hole 49*a* to the bottom face of the frame 31, is extended through the recess 47 of the slide face 43, and is stretched across the window 33 to form the string 27.

Thereafter, the fishing line is extended in the recess 47 of the slide face 45, is passed through the through hole 51*a*, and is pulled out of the top surface of the frame 31. Further, the fishing line is passed through the through hole 51*b*, is extended in the recess 47 of the slide face 45, and is stretched across the window 33 to form the line material 29.

Thereafter, the fishing line is passed through the recess 47 of the slide face 43 and the through hole 49*b* and is pulled out of the top surface of the frame 31. Then, the fishing line is hooked around the bolt 57, is wound around the bolt 55, and is fixed at the end 65 with the lock nut 61 of the bolt 55.

In this way, the strings 27 and 29 can easily be arranged on the frame 31.

Operation of the apparatus 1 according to the embodiment will be explained. In FIG. 1, the turntable 5 is turned, and objects M move toward the periphery of the turntable 5 due to centrifugal force. The objects M are pressed against the side wall 7, are moved along the side wall 7, and are shifted onto the transport path 11 through the opening 9.

In the transport path 11, the objects M are transported on the belts 19 and 21 in the direction of the arrow mark A. At this time, the guides 23 and 25 restrict the transversal movements of the objects M. Each of the objects M transported to the photographing section 13 is supported between the strings 27 and 29 and the belts 19 and 21.

When one object M is transported to the strings 27 and 29 and the guides 23 and 25, the object M is guided to the guide 39 as shown in FTC. 3, and then, the object M is smoothly supported between the strings 27 and 29 and the belts 19 and 21. The slide face 43 guides the object M so that a corner 67 of the object M may not directly hit or damage the strings 27 and 29. This arrangement improves the durability of the strings 27 and 29.

Thereafter, the object M enters the window 33 and is photographed. At this time, the object M is stably supported between the belts 19 and 21 and the strings 27 and 29, and therefore, the image-pickup device such as a CCD camera can correctly photograph the object M from the string side. The strings 27 and 29 are made from, for example, a fishing line, and therefore, are sufficiently thin to provide a clear whole image of the object M. With this image, the object M can correctly be identified and sorted.

Thereafter, the object M is transported to the downstream side of the window 33 and is shifted to the slide face 45 of the guide 41 from between the strings 27 and 29 and the belts 19 and 21. When the object M leaves the strings 27 and 29, the guide 41 prevents the corner 67 of the object M from twisting the strings 27 and 29, thereby improving the durability of the strings 27 and 29.

The object M is identified and sorted according to the image taken from the object M. If the object M is determined to be genuine, it is sent to the collecting path 15, and if it is determined to be not genuine, to the rejecting path 17.

For the sake of replacement of the strings 27 and 29, a plurality of frames 31 each provided with strings 27 and 29 may be prepared in advance. Then, the frame 31 with the strings 27 and 29 may easily be replaced with another. This realizes easy maintenance of the strings 27 and 29.

Further, the strings 27 and 29 can easily be removed from and fixed to the frame 31 by loosening and fastening the lock nuts 61. This also realizes easy maintenance of the strings 27 and 29.

The present invention is achievable in many other forms. For example, the two belts 19 and 21 may be replaced with a single belt. The strings 27 and 29 may directly be attached to and stretched along the base 3. The strings 27 and 29 may be made of any linear material. The objects to be identified and sorted according to the present invention may be tokens used in game arcades, coins, medals, and the like. The objects to be identified and sorted according to the present invention may be flat and may have circular shapes or any other shapes.

What is claimed is:

1. An apparatus for supporting objects to identify, comprising:
- an imaging device disposed to image a photographing section;
- a moving belt configured to contact and advance the objects through the photographing section;
- a line tensioned across the photographing section in the object transporting direction;
- the line being disposed between the imaging device and the objects; and
- the line being disposed opposing the moving belt such that the objects are retained by contact with the line between the line and the moving belt at least in the photographing section whereat the imaging device images the objects.

2. The apparatus of claim 1, further comprising:
- a frame configured to be detachably attached to the photographing section and having a photographing window across which the line is tensioned;
- upstream and downstream guides arranged at upstream and downstream sides of the photographing window, respectively, configured to support the line;
- a slide face formed at least on the upstream guide, configured to face the belt; and
- a recess formed in the slide face, configured to receive the line, each of the objects transported by the belt to the photographing section being guided along the slide face on the upstream side of the photographing window toward the line so that the objects are supported between the line and the belt and transported thereby.

3. The apparatus of claim 1, wherein:
- the objects are flat and have disk shapes of different diameters; and
- a plurality of belts and lines, including said belt and said line, are arranged in parallel with one another with the lines being distanced from one another and tensioned so as to retain the objects between the lines and the belts and transport the objects of different diameters between the belts and the lines.

4. The apparatus of claim 2, wherein:
- the objects are flat and have disk shapes of different diameters; and
- a plurality of belts and lines, including said belt and said line, are arranged in parallel with one another with the lines being distanced from one another and tensioned so as to retain the objects between the lines and the belts and transport the objects of different diameters between the belts and the lines.

5. The apparatus of claim 4 wherein said lines are strings.

6. The apparatus of claim 3 wherein said lines are strings.

7. The apparatus of claim 2 wherein said line is a string.

8. The apparatus of claim 1 wherein said line is a string.

9. An apparatus for conveying and imaging objects, comprising:
- an imaging device disposed to image a frame area;
- a moving belt disposed to contact and advance said objects through said frame area;
- a frame structure disposed at said frame area;
- a line tensioned across said frame area by said frame structure so as to be taught;
- said line being disposed between said imaging device and said objects; and said line being disposed opposing said moving belt such that said objects are retained between said line and said moving belt by contact with said line and thus retained in said frame area and imaged.

10. The apparatus of claim 9, further comprising:

said frame structure being detachably attached to the imaging device and having a photographing window across which the line is tensioned;

upstream and downstream guides arranged at upstream and downstream sides of the photographing window as defined by a transport direction of said moving belt, said line being held tensioned by said upstream and downstream guides;

a slide face formed at least on the upstream guide and configured to face the moving belt; and a recess formed in the slide face, configured to receive the line, each of the objects transported by the moving belt to the imaging device being guided along the slide face on the upstream side of the photographing window toward the line and the moving belt so that the object is supported between the line and the moving belt.

11. The apparatus of claim 10, further comprising:

the objects being flat and having disk shapes of different diameters;

a plurality of moving belts which include said moving belt;

a plurality of lines which include said line; and said lines and said moving belts being arranged in parallel with one another with the lines being distanced from one another to support and transport the objects of different diameters between the moving belts and the lines.

12. The apparatus of claim 9, further comprising:

the objects being flat and having disk shapes of different diameters;

a plurality of moving belts which include said moving belt;

a plurality of lines which include said line; and said lines and said moving belts being arranged in parallel with one another with the lines being distanced from one another to support and transport the objects of different diameters between the moving belts and the lines.

13. An apparatus for conveying and imaging objects, comprising:

an imaging device disposed to image a image area;

a moving belt disposed to contact and advance said objects through said image area;

a structure disposed at said image area;

a line tensioned across said image area by said structure so as to be taught;

said line being disposed between said imaging device and said objects; and said line being disposed opposing said moving belt so as to contact said objects such that said objects are retained between said line and said moving belt and in said image area and imaged.

14. The apparatus of claim 13, further comprising:

said structure being detachably attached to the imaging device and having a photographing window across which the line is stretched;

upstream and downstream guides arranged at upstream and downstream sides of the photographing window as defined by a transport direction of said moving belt, said line being held tensioned by said upstream and downstream guides;

a slide face formed at least on the upstream guide and configured to face the moving belt; and a recess formed in the slide face, configured to receive the line, each of the objects transported by the moving belt to the imaging device being guided along the slide face on the upstream side of the photographing window toward the line and the moving belt so that the object is supported between the line and the moving belt.

15. The apparatus of claim 14, further comprising:

the objects being flat and having disk shapes of different diameters;

a plurality of moving belts which include said moving belt;

a plurality of lines which include said line; and said lines and said moving belts being arranged in parallel with one another with the lines being distanced from one another to support and transport the objects of different diameters between the moving belts and the lines.

16. The apparatus of claim 13, further comprising:

the objects being flat and having disk shapes of different diameters;

a plurality of moving belts which include said moving belt;

a plurality of lines which include said line; and said lines and said moving belts being arranged in parallel with one another with the lines being distanced from one another to support and transport the objects of different diameters between the moving belts and the lines.

* * * * *